(12) United States Patent
Noguchi (10) Patent No.: US 6,744,971 B1
(45) Date of Patent: Jun. 1, 2004

(54) INFORMATION SIGNAL RECORDING/ REPRODUCING APPARATUS AND METHOD THEREOF

(75) Inventor: Tadashi Noguchi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 683 days.

(21) Appl. No.: 09/659,455

(22) Filed: Sep. 11, 2000

(30) Foreign Application Priority Data

Sep. 14, 1999 (JP) .......................................... 11-259814

(51) Int. Cl.⁷ ................................................ H04N 5/91
(52) U.S. Cl. .......................................... 386/95; 386/97
(58) Field of Search ............................ 386/46, 95, 96, 386/97, 98, 111, 112, 125, 126; 358/908

(56) References Cited

U.S. PATENT DOCUMENTS 6,459,735 B1 * 10/2002 Suito et al. ............ 375/240.15
6,532,335 B2 * 3/2003 Otomo et al. ................. 386/95

* cited by examiner

*Primary Examiner*—Huy Nguyen
(74) *Attorney, Agent, or Firm*—Sughrue Mion, PLLC (57) ABSTRACT

A description is provided of an information signal recording/ reproducing apparatus and an information signal recording/ reproducing method, in which a CM-cut reproduction can be performed without erroneously determining a program based on a stereo sound as a CM. A video and audio signal is divided into a plurality of cells on the basis of switching time points between audio modes of the video and audio signal. A play list indicating a reproducing procedure to selectively reproduce only the cells each having a reproduction time longer than a predetermined time among the plurality of cells is generated.

7 Claims, 7 Drawing Sheets

CELL DATA

| ADDRESS | (CELL START TIME) UPPER BITS | (CELL END TIME) MIDDLE BITS | (CELL AUDIO MODE) LOWER BITS | |
|---|---|---|---|---|
| A01 | 0:00:02 | 0:02:33 | STEREO | CELL 1 |
| A02 | 0:02:33 | 0:15:22 | BILINGUAL | CELL 2 |
| A03 | 0:15:22 | 0:18:22 | STEREO | CELL 3 |
| A04 | 0:18:22 | 0:27:58 | BILINGUAL | CELL 4 |
| A05 | 0:27:58 | 0:30:00 | MONAURAL | CELL 5 |
| A06 | 0:30:00 | 0:50:00 | STEREO | CELL 6 |
| A07 | 0:50:10 | 1:10:05 | MONAURAL | CELL 7 |
|  |  |  |  |  |

FIG.6B

PLAY LIST

| ADDRESS | (CELL START TIME) UPPER BITS | (CELL END TIME) MIDDLE BITS | | |
|---|---|---|---|---|
| D01 | 0:02:33 | 0:15:22 |  | CELL 2 |
| D02 | 0:18:22 | 0:27:58 |  | CELL 4 |
| D03 | 0:30:00 | 0:50:10 |  | CELL 6 |
| D04 | 0:50:10 | 1:10:05 |  | CELL 7 |
| D05 |  |  |  |  |
| D06 |  |  |  |  |
| D07 |  |  |  |  |
|  |  |  |  |  |

FIG.7

| ADDRESS | (CELL START TIME) UPPER BITS | (CELL END TIME) MIDDLE BITS | | |
|---|---|---|---|---|
| D01 | 0:30:00 | 0:50:10 | | CELL 6 |
| D02 | | | | |
| D03 | | | | |
| D04 | | | | |
| ⋮ | | | | |
| DFF | | | | |
| | | | | |
| E01 | 0:02:33 | 0:15:22 | | CELL 2 |
| E02 | 0:18:22 | 0:27:58 | | CELL 4 |
| E03 | | | | |
| E04 | | | | |
| ⋮ | | | | |
| EFF | | | | |
| | | | | |
| F01 | 0:50:10 | 1:10:05 | | CELL 7 |
| F02 | | | | |
| F03 | | | | |
| F04 | | | | |
| ⋮ | | | | |
| FFF | | | | |

PLAY LIST 1 (STEREO SOUND): D01–DFF

PLAY LIST 2 (BILINGUAL SOUND): E01–EFF

PLAY LIST 3 (MONAURAL SOUND): F01–FFF

US 6,744,971 B1

INFORMATION SIGNAL RECORDING/REPRODUCING APPARATUS AND METHOD THEREOF

BACKGROUND OF THE INVENTION

1. Field of the Invention

The invention relates to an information signal recording and/or reproducing apparatus for recording an information signal including a video image and an audio signal on a recording medium and reproducing the information signal therefrom.

2. Description of the Related Art

At present, a VTR (Video Tape Recorder) is widely spread as an apparatus for recording a TV program and many VTRs having a CM (commercial)-cut function have been put into practical use.

For example, a flag indicating whether a recorded video image is a CM or a program is recorded on a videotape in a recording operation. A recording interval corresponding to an advertisement broadcasting (CM) is detected by detecting the flag recorded on the videotape during the reproducing operation in a CM-cut reproduction, and the CM is cut by automatically fast-forward feeding only the recording interval. In this instance, an audio mode of an audio sound associated with the video image is used in order to discriminate whether the recorded video image is a CM or a program. The recording interval of which audio mode is set to the stereophonic sound is determined to be a CM, since most of the CMs are broadcasted in a stereophonic sound and most of the programs are broadcasted in a monaural sound or independent double sound (two-channel audio) such as bilingual sound or the like in a present TV broadcasting.

A music program with stereophonic sound, however, is erroneously judged as a CM in accordance with the CM discriminating method as mentioned above and a problem such that the stereo music program is not reproduced occurs, since the number of stereo music programs has been increased in recent years.

OBJECTS AND SUMMARY OF THE INVENTION

The invention is made in consideration of the above problem and it is an object of the invention to provide an information signal recording/reproducing apparatus and a recording/reproducing method of an information signal, in which a CM-cut reproduction can be performed without erroneously determining that a program with stereophonic sound is a CM.

According to the present invention, there is provided an information signal recording/reproducing apparatus using a recording medium on which a video and audio signal is recorded, comprising dividing means for dividing the video and audio signal into a plurality of cells on the basis of switching time points between audio modes of the video and audio signal; and generating means for generating a play list indicating a reproducing procedure to selectively reproduce only the cells each having a reproduction time longer than a predetermined time among the plurality of cells.

According to the present invention, there is provided an information signal recording/reproducing method of a recording medium on which a video and audio signal is recorded, comprising the steps of dividing the video and audio signal into a plurality of cells on the basis of switching time points between audio modes of the video and audio signal; and generating a play list indicating a reproducing procedure to selectively reproduce only the cells each having a reproduction time longer than a predetermined time among the plurality of cells.

DETAILED DESCRIPTION OF THE PREFERRED EMBODIMENT

An embodiment of the present invention will now be described in detail hereinbelow with reference to the drawings.

Figure 1:
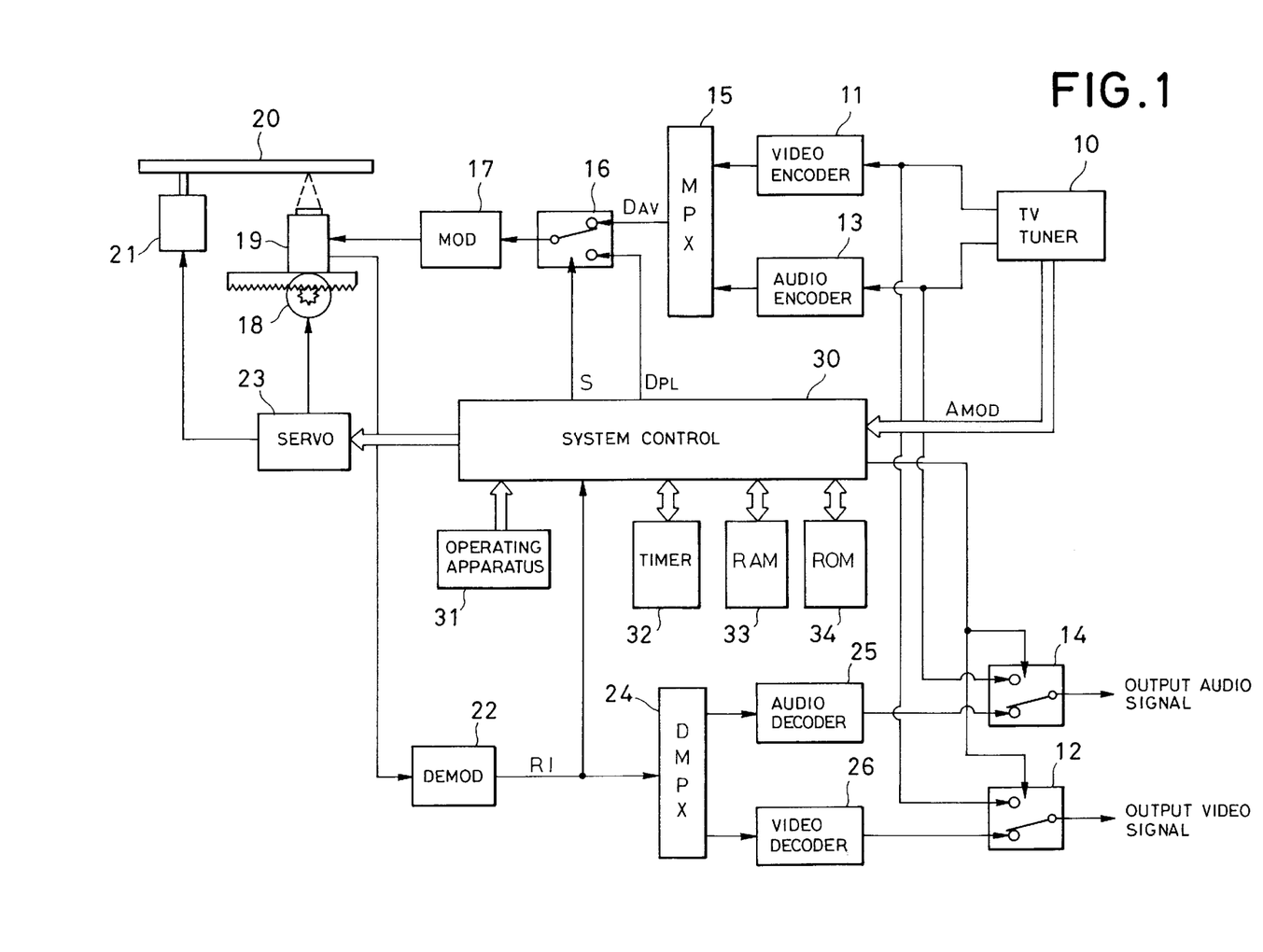
FIG. 1 is a diagram showing a configuration of an information signal recording/reproducing apparatus according to the present invention.

FIG. 1 is a diagram showing a configuration of an information signal recording/reproducing apparatus according to the present invention.

In FIG. 1, a television (TV) tuner 10 receives a television signal and demodulates the received signal, thereby obtaining a video signal carrying a program and a CM and an audio signal :associated with the video signal. The TV tuner 10 supplies the video signal to each of a video encoder 11 and a first input terminal of an output selector 12 and supplies the audio signal to each of an audio encoder 13 and a first input terminal of an output selector 14.

The TV tuner 10 further supplies an audio mode signal $A_{MOD}$ which indicates the: audio mode of the audio signal obtained by demodulating the TV signal as mentioned above to a system control circuit 30. For example, the TV tuner supplies the audio mode signal $A_{MOD}$ of "00" to the system control circuit 30 when the audio signal corresponds to the monaural sound. The audio mode signal $A_{MOD}$ of "01" is supplied when the audio signal corresponds to the stereo sound. The audio mode signal $A_{MOD}$ of "11" is supplied when the audio signal corresponds to the bilingual sound.

The video encoder 11 performs a predetermined compression code conversion, for example, MPEG (Moving Picture Experts Group) coding process to the video signal supplied from the TV tuner 10 and supplies an obtained compression video signal to a multiplexer 15. The audio encoder 13 performs a predetermined compression code converting process to the audio signal supplied from the TV tuner 10 and supplies an obtained compression audio signal to the multiplexer 15. The multiplexer 15 multiplexes the compression video signal and the compression audio signal supplied from the video encoder 11 and audio encoder 13 in a time-division manner and supplies the obtained audio/video multiplexed signal $D_{AV}$ to a first input terminal of a selector 16. A play list data signal $D_{PL}$ supplied from the system control circuit 30 is supplied to a second input terminal of the selector 16.

The selector 16 alternatively selects either the audio/video multiplexed signal $D_{AV}$ or the play list data signal $D_{PL}$ in response to a recording signal selection signal S supplied from the control circuit 30 and supplies the selected signal to a recording modulating circuit 17. The recording modulating circuit 17 performs a predetermined modulating process for recording to the audio/video multiplexed signal $D_{AV}$ or play list data signal $D_{PL}$ supplied from the selector 16. The recording modulating circuit 17 supplies the modulated recording signal to a recording/reproducing head 19 which is moved by a slider mechanism 18 in the disc radial direction of a recording disc 20.

The recording/reproducing head 19 irradiates a recording light beam according to the modulated recording signal on the recording surface of the rewritable recording disc 20 when a recording command signal is supplied from the control circuit 30. The rewritable recording disc 20 such as a DVD-R/W or the, like is rotated by a spindle motor 21. Thus, recording information corresponding to the modulated recording signal is recorded on the recording disc 20 by the irradiation of the recording light beam. When a reproduction command signal is supplied from the control circuit 30, the recording/reproducing head 19 irradiates the reading light beam on the recording surface of the recording disc 20 and receives the reflection light, thereby reading the recording information recorded on the recording disc 20. In this instance, the recording/reproducing head 19 supplies the read signal obtained by photoelectrically converting the reflection light received as mentioned above to an information demodulating circuit 22. A servo circuit 23 generates driving voltages to drive each of the slider mechanism 18 and the spindle motor 21 by an amount corresponding to various servo control signals supplied from the control circuit 30 and supplies the driving voltages to the slider mechanism 18 and the spindle motor 21.

The information demodulating circuit 22 binarizes the read signal supplied from the recording/reproducing head 19 and, thereafter, performs a predetermined demodulating process, thereby obtaining an information signal. The circuit 22 supplies the information signal as a reproduction information signal RI to each of the control circuit 30 and a demultiplexer 24. The demultiplexer 24 performs a time-division demultiplexing process to the reproduction information signal RI, thereby separating and extracting each of a compression video signal and a compression audio signal from the reproduction information signal RI, supplies the compression audio signal to an audio decoder 25, and supplies the compression video signal to a video decoder 26, respectively. The audio decoder 25 performs a converting process opposite to the code conversion performed in the audio encoder 13 to the compression audio signal, thereby obtaining an audio signal, and supplies it to a second input terminal of the output selector 14. The video decoder 26 performs a converting process opposite to the code conversion performed in the video encoder 11 to the compression video signal supplied from the demultiplexer 24, thereby obtaining a video signal, and supplies it to a second input terminal of the output selector 12.

The output selector 12 alternatively selects either the video signal supplied from the TV tuner 10 or the video signal supplied from the video decoder 26 in response to an output selection signal supplied from the control circuit 30 and generates the selected signal as an output video signal. The output selector 14 alternatively selects either the audio signal supplied from the TV tuner 10 or the audio signal supplied from the audio decoder 25 in response to an output selection signal supplied from the control circuit 30 and generates the selected signal as an output audio signal. For example, in case of generating the audio signal and video signal from the TV tuner 10 as they are, the control circuit 30 supplies the output selection signal at logic level "0" to the output selectors 12 and 14. In case of generating the audio signal and video signal reproduced from the recording disc 20, the control circuit 30 supplies the output selection signal at logic level "1" to the output selectors 12 and 14.

The control circuit 30 is connected to an operating apparatus 31 which receives various instructing operations by the user, a timer 32, an RAM (Random Access Memory) 33, and an ROM (Read Only Memory) 34 in which software to make an operation control of the information signal recording/reproducing apparatus has been stored.

Figure 2:
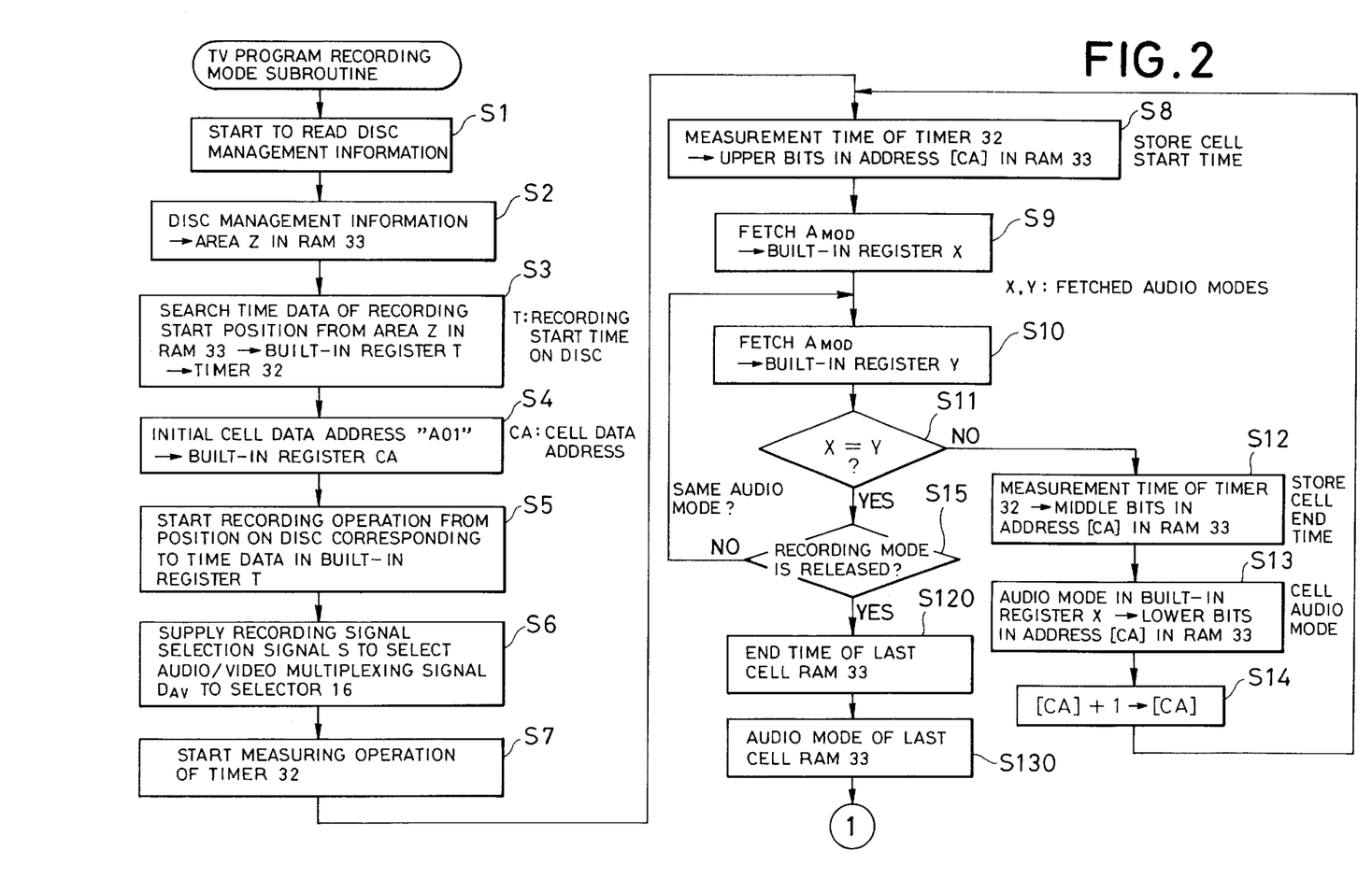
FIG. 2 is a diagram showing a television program recording mode subroutine.
Figure 3:
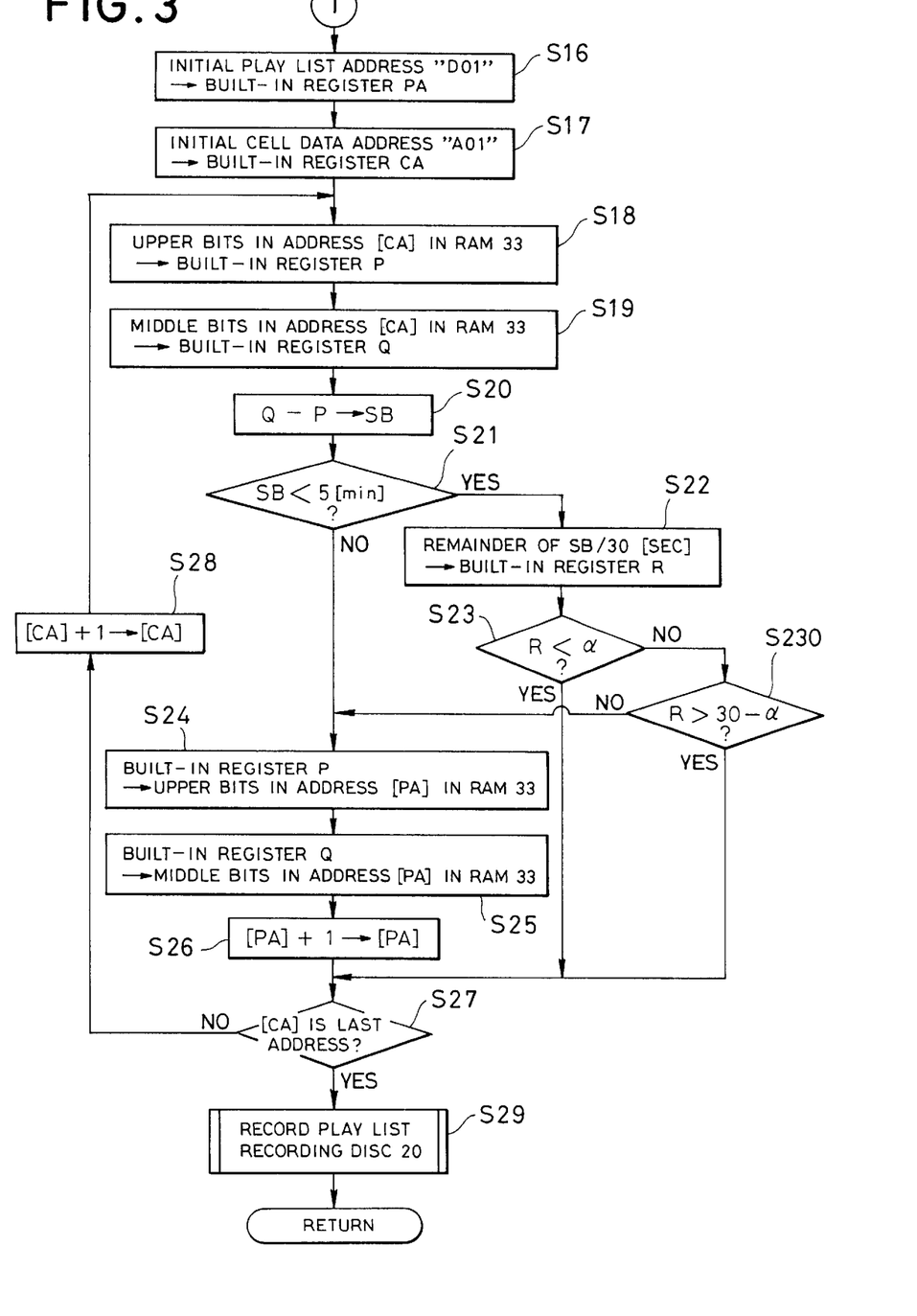
FIG. 3 is a diagram showing a television program recording mode subroutine.

When a TV program recording mode command is issued from the operating apparatus 31 by the operation of the user, the control circuit 30 temporarily interrupts the execution of a main control flow (not described) based on the software and starts the execution of a TV program recording mode subroutine as shown in FIGS. 2 and 3.

In FIG. 2, the control circuit 30 first supplies a slider servo control signal to move the recording/reproducing head 19 into a management information recording area of the recording disc 20 to the servo circuit 23 and supplies a reproduction command signal to reproduce the disc management information to the recording/reproducing head 19 (step S1). In response to the signals, the recording/reproducing head 19 is moved to the management information recording area of the recording disc 20 and starts the reading of the recording information therefrom. In this instance, the reproduction information signal RI corresponding to the disc management information read out as mentioned above is generates from the information demodulating circuit 22.

Figure 4:
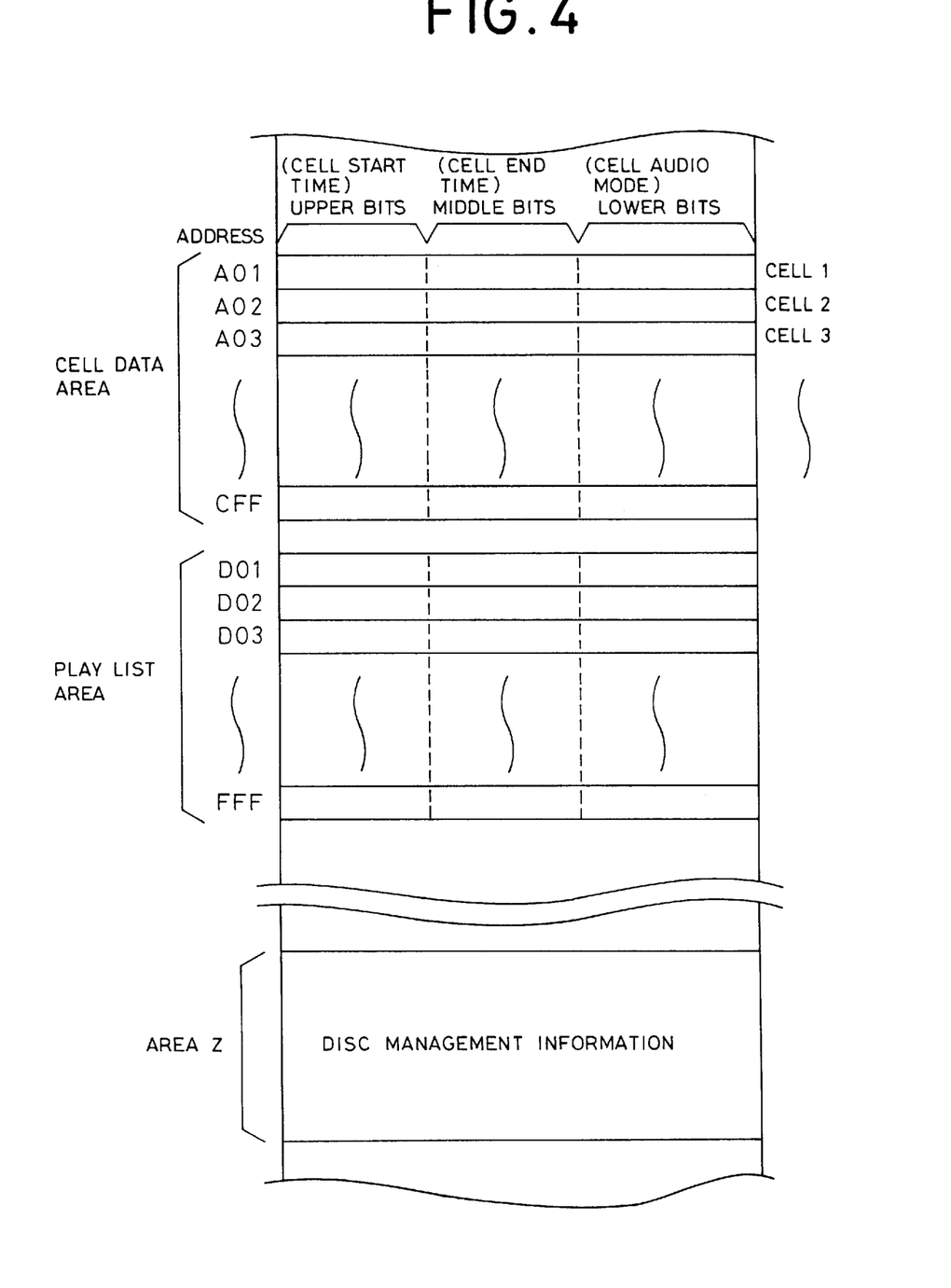
FIG. 4 is a diagram showing a part of a memory map in an RAM 33.

The control circuit 30 subsequently fetches the reproduction information signal RI and writes the disc management information into a memory area Z in the RAM 33 as shown in FIG. 4 (step S2). The system control circuit 30, then, searches recording start time data of a recording start position from the memory area Z in the RAM 33, stores it into a built-in register T (not shown), and sets time shown by the recording start time data as an initial time into the timer 32 (step S3).

The control circuit 30 subsequently writes "A01" as an initial cell data address into a built-in register CA (not shown) (step S4).

The control circuit 30 subsequently supplies a slider servo control signal to the servo circuit 23 in order to move the recording/reproducing head 19 to a position on the recording disc 20 shown by the recording start time stored in the built-in register T and supplies a recording command signal for starting the recording operation to the recording/reproducing head 19 (step S5). The control circuit 30, then, subsequently supplies the recording signal selection signal S for supplying the audio/video multiplexed signal $D_{AV}$ generated in the multiplexer 15 to the recording modulating circuit 17 to the selector 16 (step S6). By the execution of steps S5 and S6, the audio signal and the video signal corresponding to the TV program obtained in the TV tuner 10 are subjected to the compression coding process, multiplexing process, and recording modulating process as mentioned above and, thereafter, recorded on the recording disc 20.

The control circuit 30 supplies a count start command signal to the timer 32 in order to start the counting operation of the timer 32 (step S7). By the execution of step S7, the timer 32 starts the counting operation of the time from the recording start time set in step S3.

The control circuit 30 subsequently fetches the measurement time of the; timer 32 and stores it as a cell start time into upper bits in address [CA] in a cell data area in the RAM 33 as shown in FIG. 4 (step S8). It should be noted that "[CA]" denotes the value stored in the built-in register CA and addresses "A01", "A02", "A03", . . . , and "CFF" in the cell data area as shown in FIG. 4 are set. The control circuit 30 subsequently fetches the audio mode signal $A_{MOD}$ supplied from the TV tuner 10 and stores it into a built-in register X (step S9). The control circuit 30, then, fetches the audio mode signal $A_{MOD}$ supplied from the TV tuner 10 and stores it into a built-in register Y (step S10). The control circuit 30 subsequently discriminates whether the audio mode signals $A_{MOD}$ stored in the built-in registers X and Y indicate the same audio mode or not (step S11). If it is determined in step S11 that they do not show the same audio mode, the control circuit 30 fetches the measurement time of the timer 32 and stores it as a cell end time into middle bits in address [CA] in the cell data area in the RAM 33 as shown in FIG. 4 (step S12). The control circuit 30, then, stores the audio mode stored in the built-in register X as a cell audio mode into lower bits in address [CA] in the cell data area in the RAM 33 as shown in FIG. 4 (step S13). The control circuit 30 subsequently rewrites the storage contents in the built-in register CA with the address obtained by adding "1" to the address in the cell data area stored in the built-in register CA (step S14). When step S14 is finished, the control circuit 30 is returned to step S8 and repeats the operations as mentioned above.

If it is determined in step S11 that the audio mode signals $A_{MOD}$ stored in the built-in registers X and Y indicate the same audio mode, the control circuit 30 discriminates whether a release command of the TV program recording mode has been issued from the operating apparatus 31 or not (step S15). If it is determined in step S15 that the release command is not issued, the control circuit 30 is returned to step S10 and repeats the operations as mentioned above.

According to steps S1 to S15, the video and audio signals carrying the program and CM obtained by the TV tuner 10 are recorded on the recording disc 20 and a cell start time, a cell end time, and the audio mode of each cell in the case where the video and audio signals are divided into a plurality of cells on the basis of a switching timing of the audio mode of the audio signal are written into the cell data area as shown in FIG. 4, respectively.

Figure 5:
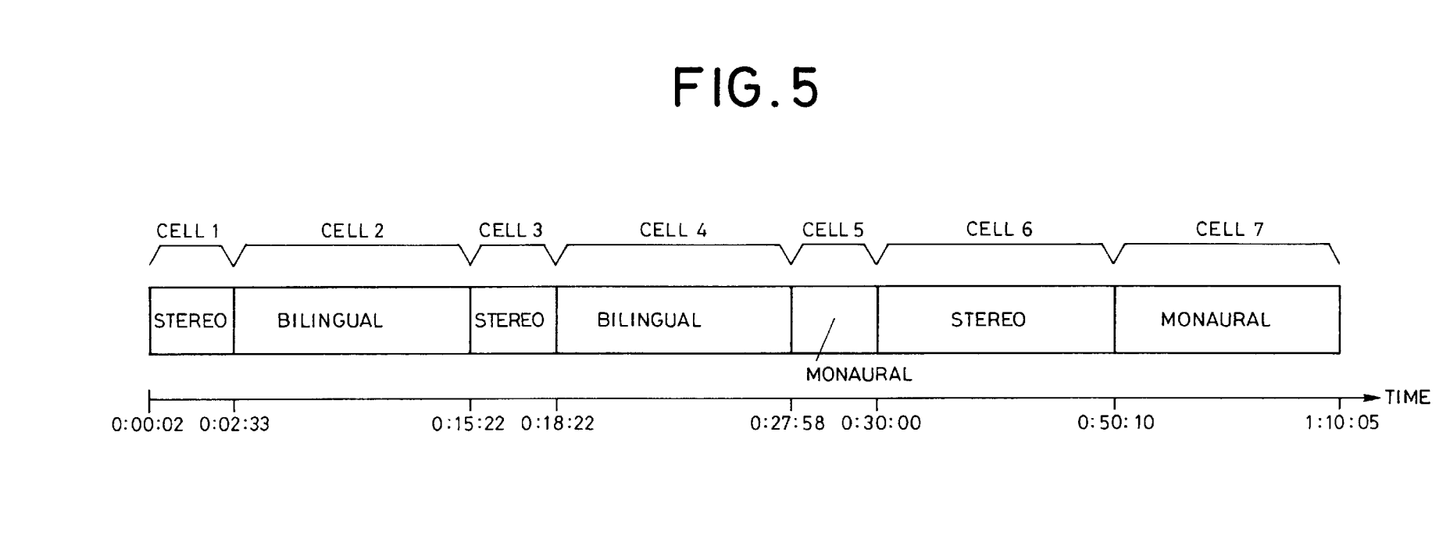
FIG. 5 is a diagram showing an example of a plurality of TV programs which are recorded on a recording disc 20 and their audio modes.
Figure 6A:
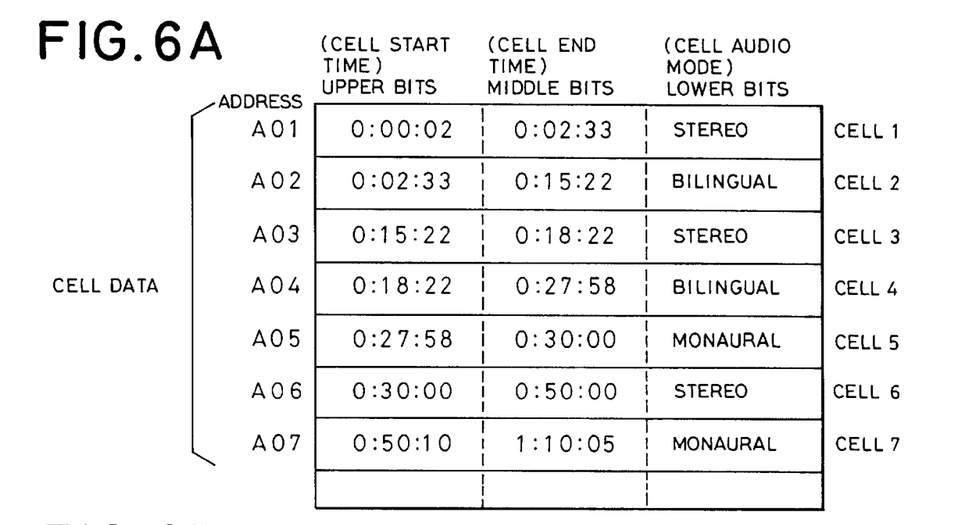
FIGS. 6A and 6B are diagrams showing examples of cell data and play lists which are formed in accordance with a recording mode shown in FIG. 5.

For example, in the case where the video and audio signals showing the TV program and CM are generated from the TV tuner 10 in a format as shown in FIG. 5, cell data of each cell is formed in a format as shown in FIG. 6A into each of addresses "A01" to "A07" in the cell data area in the RAM 33.

If it is determined in step S15 that the release command of the TV program recording mode has been issued, the control circuit 30 stores the end time of the last cell into the RAM 33 (step S120), stores the audio mode of the last cell into the RAM 33 (step S130), and thereafter, stores "D01" as an initial play list address into a built-in register PA (step S16). The control circuit 30 subsequently stores "A01" as an initial cell data address into the built-in register CA (step S17). The control circuit 30, then, reads out the storage contents in address [CA] in the cell data area in the RAM 33 as shown in FIG. 4 and stores its upper bits, namely, the cell start time into a built-in register P (step S18). The control circuit 30 subsequently stores middle bits in address [CA] in the RAM 33, namely, the cell end time into a built-in register Q (step S19).

The control circuit 30 subsequently subtracts the cell start time stored in the built-in register P from the cell end time stored in the built-in register Q and stores resultant time as a cell reproduction time into a built-in register SB (step S20). The control circuit 30, then, discriminates whether the cell reproduction time stored in the built-in register SB is shorter than 5 minutes or not, thereby performing a primary discrimination whether the relevant cell indicates the CM or not (step S21).

If it is determined in step S21 that the cell reproduction time is shorter than 5 minutes, the control circuit 30 stores a remainder obtained when the cell reproduction time stored in the built-in register SB is divided by 30 seconds into a built-in register R (step S22). The control circuit 30 subsequently discriminates whether the value in the built-in register R is smaller than a predetermined value α, for example, 1 second or not (step S23). If it is determined in step S23 that the value in the built-in register R is not smaller than the predetermined value a, the control circuit 30 subsequently discriminates whether the value in the built-in register R is larger than (30–α) or not (step S230). That is, in steps S23 and S230, when the cell reproduction time is shorter than 5 minutes, the control circuit 30 discriminates whether the cell reproduction time can be completely divided by almost 30 seconds or not, thereby finally discriminating whether the cell indicates the CM or not. The above processes are based on the fact that, usually, the CM is broadcasted for a time which is equal to or shorter than 5 minutes and is integer times as long as 30 seconds. If it is determined in step S230 that the value in the built-in register R is not larger than (30–α), namely, when it is determined that the cell reproduction time cannot be completely divided by 30 seconds or when it is determined in step S21 that the cell reproduction time stored in the built-in register SB is longer than 5 minutes, the control circuit 30 decides that the cell indicates the program, and executes following step S24.

In step S24, the control circuit 30 stores the cell start time stored in the built-in register P into upper bits in address [PA] in a play list area in the RAM 33 as shown in FIG. 4 (step S24). Here, [PA] denotes a value stored in the built-in register PA and addresses "D01", "D02", "D03", . . . , and "FFF" in the play list area as shown in FIG. 4 are set, respectively. The control circuit 30 subsequently stores the cell end time stored in the built-in register Q into middle bits in address [PA] in the play list area in the RAM 33 as shown in FIG. 4 (step S25). The control circuit 30, then, subsequently rewrites the storage contents of the built-in register PA with the address obtained by adding "1" to the play list address stored in the built-in register PA (step S26). The control circuit 30 subsequently discriminates whether the cell data address stored in the built-in register CA is the last address or not (step S27). If it is determined in step S27 that the cell data address is not the last address, the control circuit 30 rewrites the: storage contents of the built-in register CA with the address obtained by adding "1" to the cell data address stored in the built-in register CA (step S28). After step S28, the control circuit 30 returns to the execution of step S18 and repetitively executes the operations as mentioned above.

If it is determined in step S23 that the value in the built-in register R is smaller than the predetermined value α, or if it is determined in step S230 that the value in the built-in register R is larger than (30–α), namely, if it is determined that the cell reproduction time can be divided by almost 30 seconds, the control circuit 30 determines that the relevant cell indicates the CM and executes step S27 without writing data into the RAM 33.

By the execution of steps S16 to S28, the cell data whose cell reproduction time is longer than 5 minutes is extracted from the respective cell data stored in the cell data area in the RAM 33 shown in FIG. 4, it is determined that the extracted cell data indicates the cell corresponding to the program other than the CM, and the cell data is written into the play list area in the RAM 33 shown in FIG. 4.

Figure 6B:
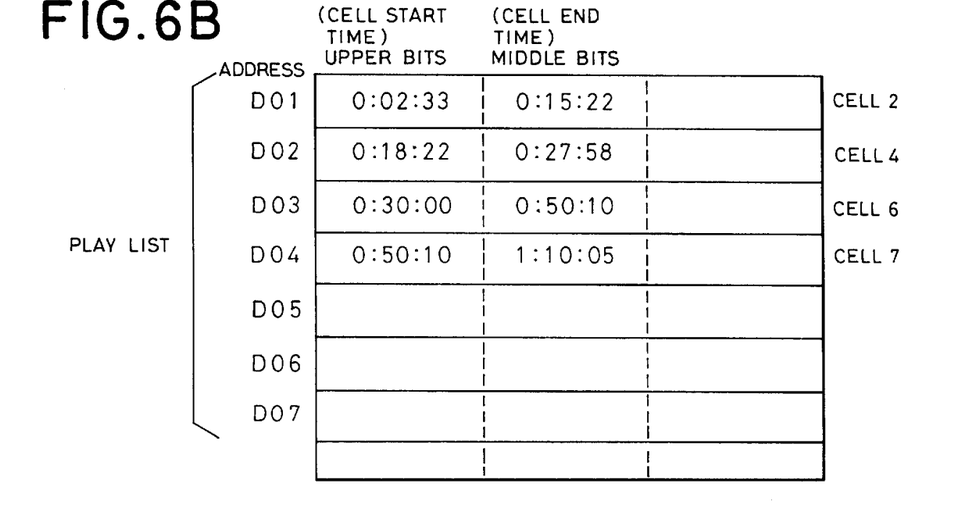

For example, in the case where a plurality of TV programs (including CMs) having the audio mode as shown in FIG. 5 have been recorded on the recording disc 20, cell data as shown in FIG. 6A is formed and a play list as shown in FIG. 6B is generated on the basis of the cell data shown in FIG. 6A.

More particularly, when a plurality of TV programs recorded on the recording disc 20 as shown in FIG. 5 are divided into cells 1 to 7 on the basis of switching time points between the audio modes, only the cell start times and the cell end times regarding the cells each having a reproduction time longer than 5 minutes, namely, cells 2, 4, 6, and 7 are registered as a play list as shown in FIG. 6B. In this instance, the cells each having a reproduction time shorter than 5 minutes, namely, cells 1, 3, and 5 are determined to be CMs and are not registered in the play list.

The control circuit 30 executes a play list recording subroutine to record the play list on the recording disc 20 (step S29). In the play list recording subroutine, the control circuit 30 first supplies a slider servo control signal to the servo circuit 23 in order to move the recording/reproducing head 19 into the management information recording area of the recording disc 20 and supplies a recording command signal to start the recording operation to the recording/reproducing head 19. The control circuit 30 subsequently reads out the play list comprising the cell data which indicates the cell start times and cell end times stored in the play list area in the RAM 33 as shown in FIG. 4 and supplies it as a play list data signal $D_{PL}$ to the selector 16. The control circuit 30 further supplies the recording signal selection signal S to the selector 16 in order to supply the play list data $D_{PL}$ to the recording modulating circuit 17 in place of the audio/video multiplexed signal $D_{AV}$.

According to the execution of the play list recording subroutine in step S29, for example, the play list indicating the start time and the end time is recorded in the management information recording area of the recording disc 20 every cell as shown in FIG. 6B.

After execution of step S29, the control circuit 30 exits the TV program recording mode subroutine shown in FIGS. 2 and 3 and returns to the execution of the main routine.

In case of reproducing the recording information from the recording disc 20 on which the TV program has been recorded by the execution of the TV program recording mode subroutine, first, the control circuit 30 reproduces the play list from the management information recording area of the recording disc 20. The control circuit 30, then, reproduces the recording information recorded on the recording disc 20 in accordance with the play list.

For example, since the play list shown in FIG. 6B is recorded in the management information recording area of the recording disc 20 on which a plurality of TV programs have been recorded in the format as shown in FIG. 5, only the video and audio signals corresponding to the cells 2, 4, 6, and 7 are continuously reproduced in accordance with the play list. The cells in each of which the reproduction time is shorter than 5 minutes, cells 1, 3, and 5 are determined to be the CMs and skipped and the cell data is reproduced, thereby realizing the CM-cut function.

According to the present invention, therefore, a situation such that the program such as a music program of which audio mode is the stereo sound mode is erroneously determined to be the CM can be avoided.

Figure 7:
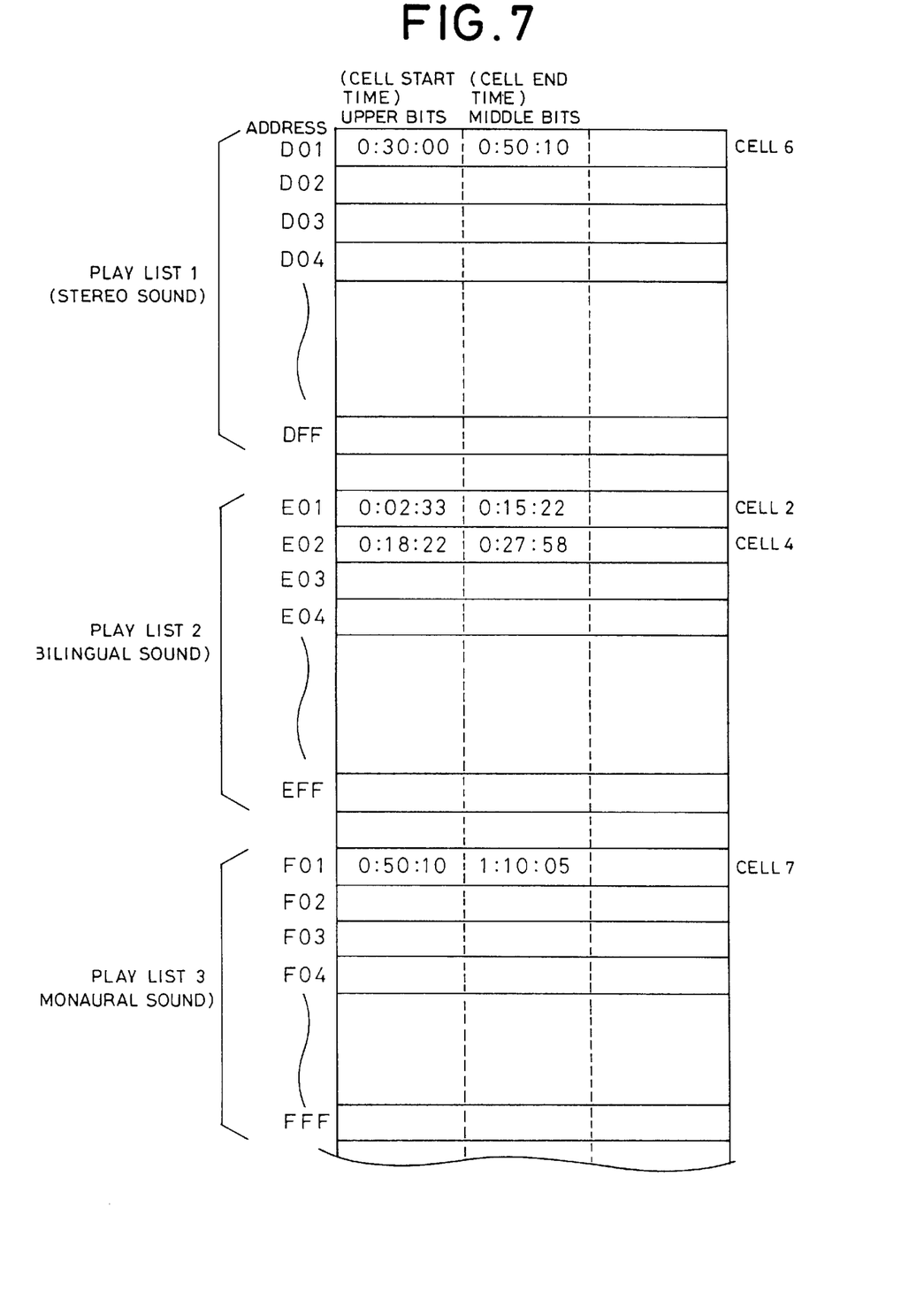
FIG. 7 is a diagram showing another example of a play list formed every audio mode.

In the aforementioned embodiment, the cell data regarding all cells as reproduction targets is described in one play list as shown in FIG. 6B, it is also possible to form an independent play list every audio mode as shown in FIG. 7 and record the list into the management information recording area of the recording disc 20. More particularly, only the cell data corresponding to the stereo sound is described as a play list 1 into a range of addresses "D01" to "DFF" in the play list area shown in FIG. 4. Further, only the cell data corresponding to the bilingual sound is described as a play list 2 into the range of addresses "E01" to "EFF". Only the cell data corresponding to the monaural sound is described as a play list 3 into the range of addresses "F01" to "FFF". According to the method, for example, only the cell data of cell 6 corresponding to the stereo sound is registered as a play list 1 as shown in FIG. 7 from the play list shown in FIG. 6B. Further, the cell data regarding the cells 2 and 4 corresponding to the bilingual sound is registered as a play list 2 from the play list shown in FIG. 6B, and the cell data regarding the cell 7 corresponding to the monaural sound is registered as a play list 3.

Therefore, if the :user selects the play list 2 and reproduces, for example, only a movie using the bilingual sound can be continuously reproduced from various recording programs recorded on the recording disc 20 while cutting the CMs.

The invention is not limited to the foregoing embodiment.

For example, according to the embodiment, although the control circuit 30 discriminates whether the cell reproduction time is equal to or shorter than 5 minutes or not in step S21 shown in FIG. 3, thereby performing the primary discrimination about whether the cell indicates the CM or not, the comparison time is not limited to 5 minutes. It is sufficient to set the comparison time to a time during which the program and the CM can be distinguished.

The final decision about whether the cell indicates the CM or not is made by discriminating whether the cell reproduction time is integer times as long as 30 seconds or not in steps S22, S23, and S230. The final decision, however, can be omitted, since the CM which is broadcasted after the end of the program is not always integer times as long as 30 seconds.

According to the embodiment, although the system control circuit 30 records the play list on the recording disc 20 by executing step S29, the play list can be also stored in memory means such as a memory, a hard disk, or the like built in the apparatus main body without recording on the recording disc 20. In this instance, it is obscure to which disc the play-list stored in the memory means corresponds if the recording disc 20 is once removed out of the apparatus. The play list, therefore, is stored in the memory means in association with discrimination information for discriminating the disc such as TOC information or the like of the recording disc 20. When the same recording disc is reproduced next time, therefore, the corresponding play list can be automatically read out from the memory means on the basis of the discrimination information.

Further, in the embodiment, the operation has been described with respect to what is called an optical type information signal recording/reproducing apparatus, as an example, such that the recording information is recorded and reproduced on/from the recording disc 20 by the irradiation of the recording light beam. The information signal recording/reproducing apparatus according to the present invention, however, is not limited to the optical type. For example, the invention can be applied to any type of information signal recording/reproducing apparatus using the recording/reproducing system such as a magneto-optic type or a magnetic type as represented by a hard disk apparatus.

As described in detail above, in the present invention, when a plurality of TV programs (including CMs) are recorded on the recording medium, each TV program is divided into a plurality of cells on the basis of the switching time points between the audio modes, a reproduction list (play list) indicating a reproducing procedure to selectively reproduce only the cells each having a cell reproduction time is longer than the predetermined,time is generated, and the list is recorded on the recording medium.

Accordingly, the CM-cut reproduction can be performed without erroneously determining the music program or the like based on the stereo sound as a CM by reproducing the play list from the recording medium, and by reproducing the recording information from the recording medium with the procedure according to: the play list.

The invention has been described with reference to the preferred embodiments thereof. It should be understood by those skilled in the art that a variety of alterations and modifications may be made from the embodiments described above. It is therefore contemplated that the appended claims encompass all such alternations and modifications.

What is claimed is:

1. An information signal recording/reproducing apparatus using a recording medium on which a video and audio signal is recorded, comprising:

dividing means for dividing said video and audio signal into a plurality of cells on the basis of switching time points between audio modes of said video and audio signal; and generating means for generating a play list indicating a reproducing procedure to selectively reproduce only the cells each having a reproduction time longer than a predetermined time among said plurality of cells.

2. An apparatus according to claim 1, further comprising:

means for recording said play list on said recording medium; and reproducing means for reproducing recording information from said recording medium in accordance with said reproducing procedure indicated in said play list.

3. An apparatus according to claim 1, wherein said audio modes include one of a stereo sound, a two-channel audio, and a monaural sound.

4. An apparatus according to claim 1, wherein said predetermined time is substantially equal to 5 minutes.

5. An apparatus according to claim 1, further comprising:

a television receiver for obtaining said video and audio signal carrying an advertisement and a program by receiving and demodulating a television signal and for generating a signal which indicates said audio modes in said video and audio signal.

6. An information signal recording/reproducing method of a recording medium on which a video and audio signal is recorded, comprising the steps of:

dividing said video and audio signal into a plurality of cells on the basis of switching time points between audio modes of said video and audio signal; and generating a play list indicating a reproducing procedure to selectively reproduce only the cells each having a reproduction time longer than a predetermined time among said plurality of cells.

7. A method according to claim 6, further comprising the steps of:

recording said play list on said recording medium; and reproducing recorded information from said recording medium in accordance with said reproducing procedure indicated in said play list.

* * * * *